(12) United States Patent  
Cho

(10) Patent No.: US 8,712,470 B2  
(45) Date of Patent: Apr. 29, 2014

(54) METHOD AND DEVICE FOR SYNTHESIZING IMAGE

(75) Inventor: Sung Dae Cho, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 672 days.

(21) Appl. No.: 12/592,041

(22) Filed: Nov. 18, 2009

(65) Prior Publication Data

US 2010/0124941 A1    May 20, 2010

(30) Foreign Application Priority Data

Nov. 19, 2008   (KR) .......................... 10-2008-0115019

(51) Int. Cl.
- *H04M 1/00* (2006.01)
- *H04N 5/76* (2006.01)
- *G06F 3/041* (2006.01)

(52) U.S. Cl.
USPC ................... 455/556.1; 348/231.99; 345/173; 455/411; 455/41.1

(58) Field of Classification Search
None
See application file for complete search history.

(56) References Cited

U.S. PATENT DOCUMENTS

| | | | |
|---|---|---|---|
| 6,516,154 B1 * | 2/2003 | Parulski et al. | 396/287 |
| 7,764,308 B2 * | 7/2010 | Kusaka et al. | 348/211.3 |
| 7,813,557 B1 * | 10/2010 | Bourdev | 382/205 |
| 2002/0054059 A1 * | 5/2002 | Schneiderman | 345/700 |
| 2005/0021805 A1 * | 1/2005 | De Petris et al. | 709/231 |
| 2009/0055736 A1 * | 2/2009 | Yoon | 715/700 |

* cited by examiner

*Primary Examiner* — Jinsong Hu
*Assistant Examiner* — William Nealon

(57) ABSTRACT

A method and device for synthesizing an image for audiovisual communication includes: generating, if a request for synthesizing a sensor image input through a camera sensor and an image designated by a user is input, a synthesis image of the sensor image and the designated image. The method also includes storing, when the synthesis image is generated, object information of an object of the sensor image and object information of an object of the designated image; and changing, if a sensor image is input in which object information of the sensor image object has changed, object information of the designated image object according to the changed object information of the sensor image object and synthesizing the sensor image and the designated image in which object information has changed.

22 Claims, 7 Drawing Sheets

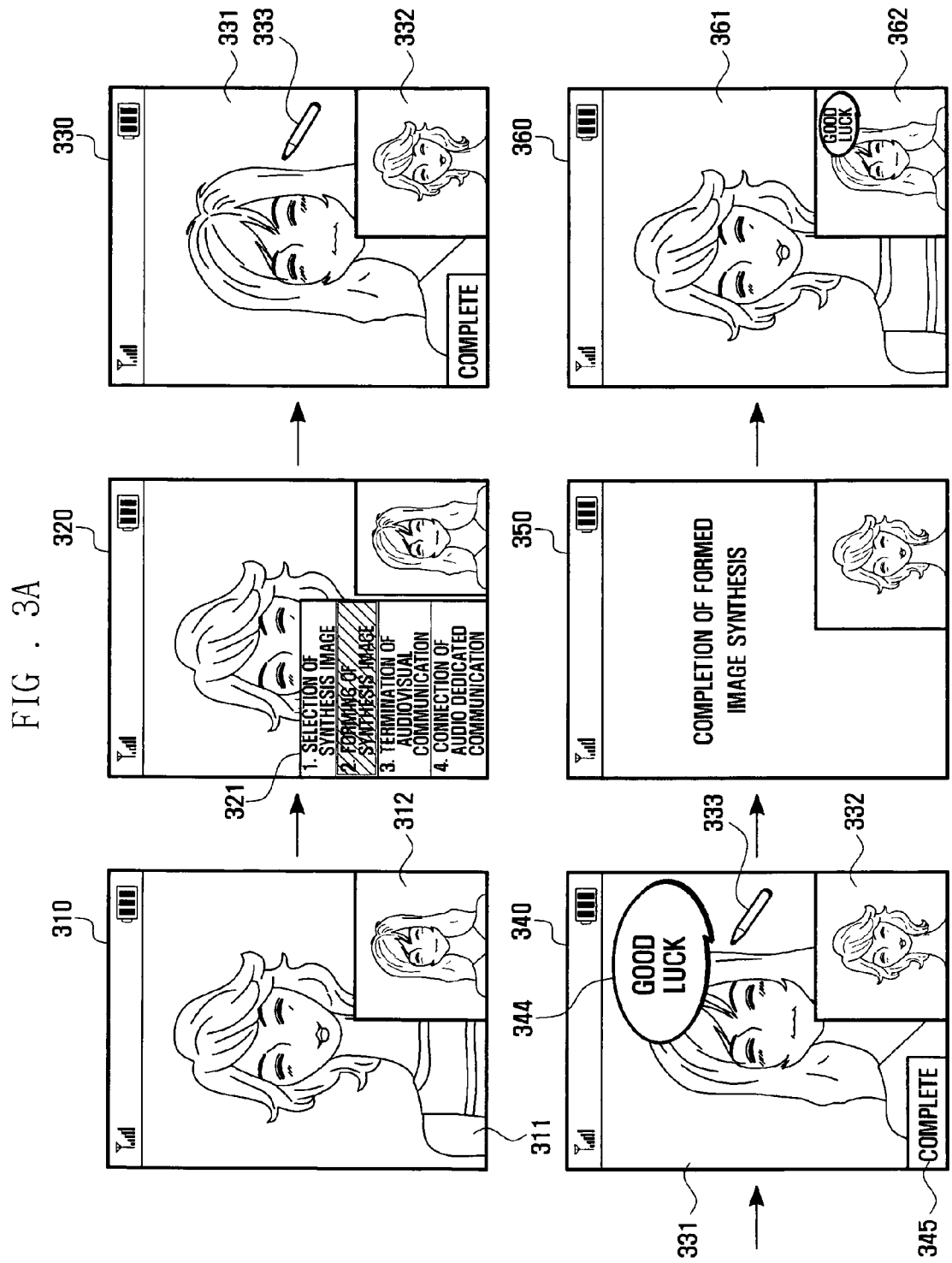

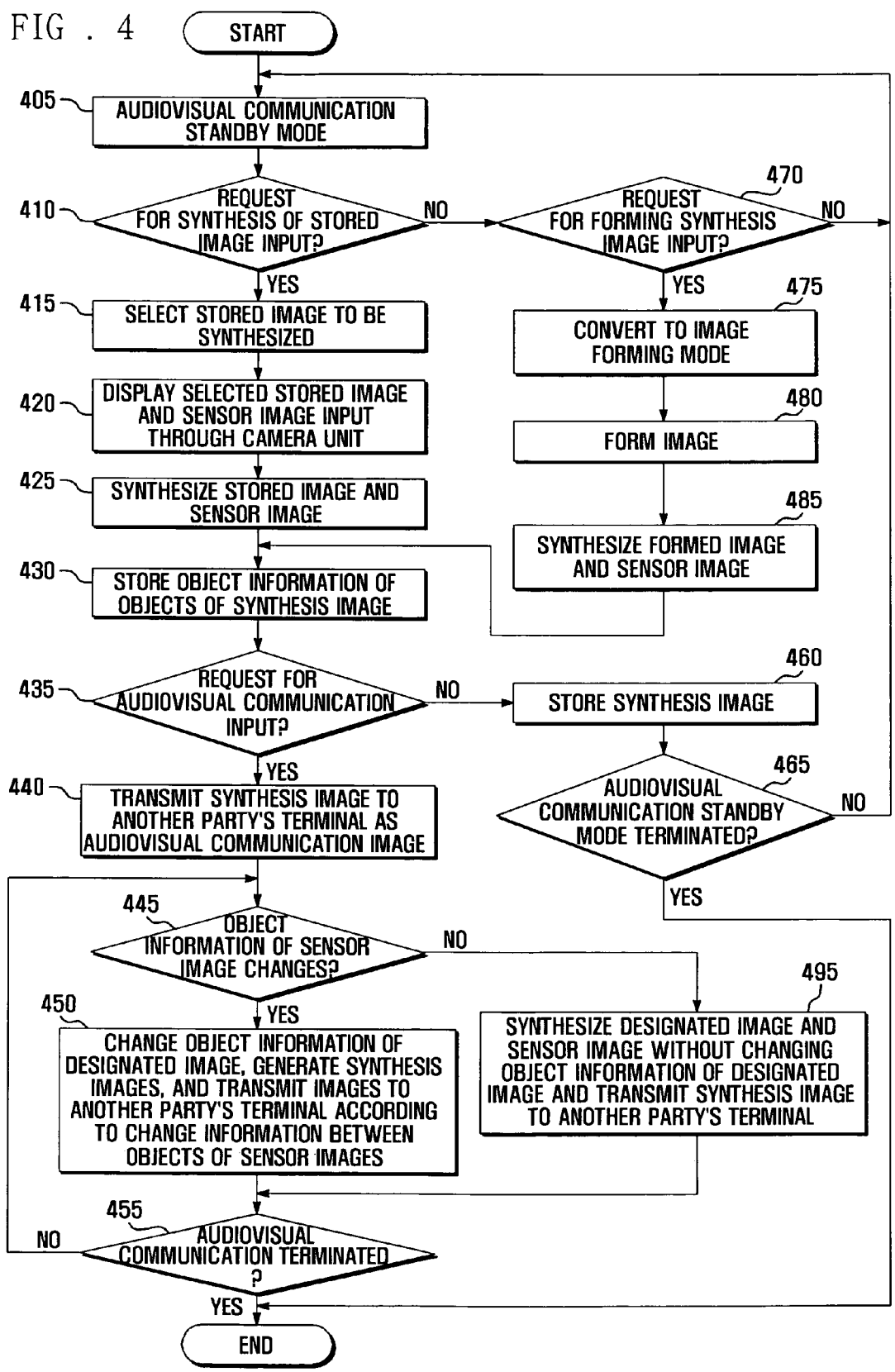

METHOD AND DEVICE FOR SYNTHESIZING IMAGE

CROSS-REFERENCE TO RELATED APPLICATION(S) AND CLAIM OF PRIORITY

The present application is related to and claims priority to and the benefit of Korean Patent Application No. 10-2008-0115019 filed in the Korean Intellectual Property Office on Nov. 19, 2008, the entire contents of which are incorporated herein by reference.

TECHNICAL FIELD OF THE INVENTION

The present invention relates to image synthesis in a mobile terminal, and more particularly, to a method and device for synthesizing an image for audiovisual communication in a mobile terminal.

BACKGROUND OF THE INVENTION

Due to development of technology, a service using an image in a mobile terminal is provided and widely used. For example, a service for acquiring an image using a camera unit provided in a mobile terminal and a service for receiving an image transmitted from another mobile terminal are widely used. Currently, such a service for using an image in a mobile terminal has developed from a simple use of an image to services such as editing and synthesis of images.

A second generation mobile communication system provides an audio dedicated communication service, whereas a third generation mobile communication system provides a communication service using packet data and multimedia data as well as audio dedicated communication, thereby providing a service using an image. The service using an image in a mobile terminal may include an audiovisual communication service for performing communication while viewing another party. The audiovisual communication service is performed by simultaneously transmitting image data input through a camera unit and audio data input through a microphone. The audiovisual communication service provides a visual function of viewing another party in addition to an audio dedicated communication service through transmission of image data including a user's image, i.e., image transmission. However, because the audiovisual communication service provides an image input through a camera unit, a portion of a user's image that the user may be reluctant to expose is provided to another party, or a particular character of a user that the user desires to portray may be not shown by simply transmitting an image. In order to solve the problem, a replacement image can be provided, or image editing such as image synthesis can be used. However, because the audiovisual communication service transmits an image input through a camera sensor in real time, when an image is edited or when images are synthesized, changes of an object in real time are not reflected in the transmitted images. Therefore, a method of solving the problem is requested.

SUMMARY OF THE INVENTION

To address the above-discussed deficiencies of the prior art, it is a primary object to provide a method and device for synthesizing an image. The present invention further provides a method and device for synthesizing an image for audiovisual communication.

In accordance with an aspect of the present invention, a method of synthesizing an image in a mobile terminal includes: generating, if a request for synthesizing a sensor image input through a camera sensor and an image designated by a user is input, a synthesis image of the sensor image and the designated image; storing, when the synthesis image is generated, object information of an object of the sensor image and object information of an object of the designated image; and changing, if a sensor image is input in which object information of the sensor image object has changed, object information of the designated image object according to the changed object information of the sensor image object and synthesizing the sensor image and the designated image in which object information has changed.

In accordance with another aspect of the present invention, an image synthesizing device in a mobile terminal includes: a camera unit configured to input a sensor image; a display unit configured to display the sensor image and an image designated by a user; a controller configured to synthesize, if a request for synthesizing an image is input, the sensor image displayed in the display unit and the designated image and change, if object information of an object of the sensor image changes, object information of an object of the designated image to correspond to the change of object information of the sensor image object and further configured to synthesize the sensor image and the designated image in which object information has changed; and a storage unit configured to store, when the images are synthesized, the object information of the sensor image object and the object information of the designated image object.

The object of the present invention is not limited to the above-described objects and other objects will be understood by those skilled in the art from the following description.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates screen examples for a method of synthesizing an image for audiovisual communication according to another exemplary embodiment of the present invention;

FIG. 4 illustrates a flowchart for a method of performing audiovisual communication using a synthesis image according to another exemplary embodiment of the present invention.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal.

In the following description, a case of synthesizing an image provided to another party's terminal while performing audiovisual communication is exemplified. However, the present invention is not limited to synthesis of an image when performing audiovisual communication and can be applied to a case of synthesizing a still image in which an object of the image does not move.

Figure 1:
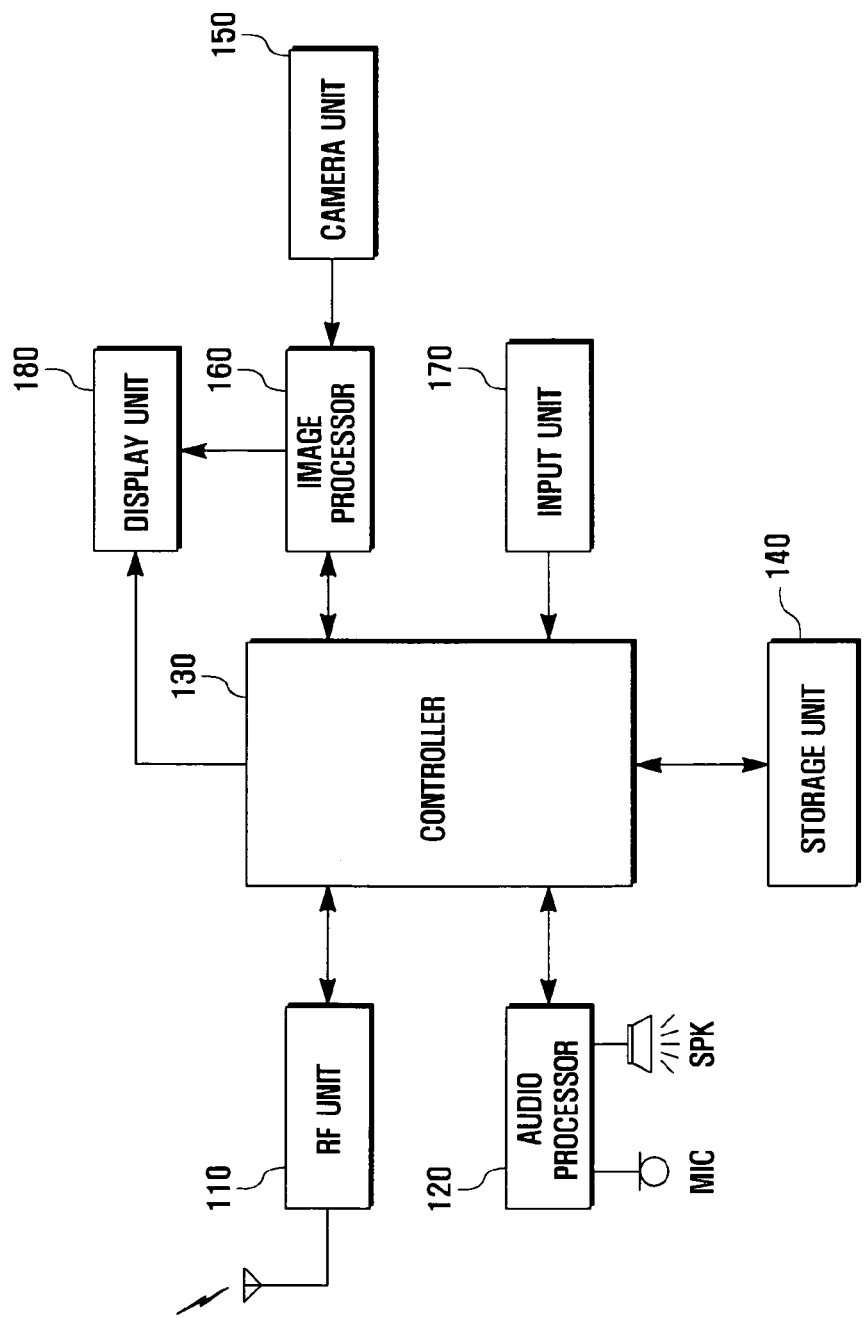
FIG. 1 illustrates a block diagram of a configuration of a mobile terminal for audiovisual communication according to an exemplary embodiment of the present invention.

FIG. 1 illustrates a block diagram for a configuration of a mobile terminal for audiovisual communication according to an exemplary embodiment of the present invention. Although FIG. 1 illustrates a mobile communication terminal for performing audiovisual communication, the present invention is not limited thereto and can be applied to any terminal that includes a camera unit and capable of performing audiovisual communication.

Referring to FIG. 1, a mobile terminal capable of audiovisual communication according to the present exemplary embodiment includes a radio frequency (RF) unit 110, audio processor 120, controller 130, storage unit 140, camera unit 150, image processor 160, input unit 170, and display unit 180. The RF unit 110 transmits and receives a wireless signal to perform wireless communication with a base station. For this, the RF unit 110 up-converts a base-band signal into an RF signal and amplifies the RF signal, and low-noise amplifies an RF signal received through an antenna and down-converts the low-noise amplified RF signal into an base-band signal, and outputs the down-converted signal to the controller 130. The RF unit 110 outputs an audiovisual communication signal received through the antenna to the controller 130 and transmits an input audiovisual communication signal received from the controller 130 to a base station through the antenna. The audio processor 120 processes the input audio signal. Specifically, the audio processor 120 decodes an audio signal received from the controller 130 and outputs the audio signal through a speaker SPK, and converts an audio signal input through a microphone MIC to a digital signal and outputs the converted digital signal to the controller 130. The controller 130 controls general operations of the mobile terminal. Particularly, if a request for image synthesis for audiovisual communication is input, the controller 130 synthesizes an image input through the camera unit 150 and an image designated by a user. The controller also encodes the synthesized image into an image data format for audiovisual communication, and transmits the encoded image data format to another party. The storage unit 140 stores programs and data for performing various functions of the mobile terminal. Further, the storage unit 140 stores still images in units of a frame and stores, when synthesizing images, position information of an object of a sensor image input through a camera sensor of the camera unit 150 and position information of an object of a designated image.

The camera unit 150 receives an image signal to photograph an external object. In order to input an image signal, the camera unit 150 includes a camera sensor that converts the input optical signal to an analog electrical signal and a signal processor that converts the analog signal converted by the camera sensor to a digital signal. The image processor 160 processes an image signal output by the camera unit 150 to correspond to a characteristic and a size of the display unit 180 and outputs the image signal. An image codec that compresses an image signal in a preset method and that restores a compressed image signal to an original image signal is included in the image processor 160 or the controller 130. The image codec may be a Joint Photographic Coding Experts Group (JPEG) codec or a Moving Picture Experts Group (MPEG) 4 codec. When images are synthesized to perform audiovisual communication, the synthesized images are encoded into a data format for audiovisual communication through the image codec. Further, the image processor 160 may have a frame buffer (not shown) that stores a frame image data input through the camera unit 150 and processed in units of a frame. When a request for forming an image is input, a formed image is converted to a frame and synthesized with frame image data stored in the frame buffer.

The input unit 170 can be formed as a keypad or a touch pad. The input unit 170 includes character keys, numeral keys, various function keys, and an external volume key. The input unit 170 outputs a key input signal corresponding to a key input by a user to the controller 130. The display unit 180 displays an image signal output by the image processor 160 on a screen and displays user data output by the controller 130 on the screen. The display unit 180 can use a liquid crystal display (LCD), including an LCD controller, memory unit that stores image data, and LCD display element. When the LCD uses a touch screen method, the LCD also performs a function of an input unit, as described in detail later in relation to FIGS. 3A, 3B, and 5.

Figure 2A:
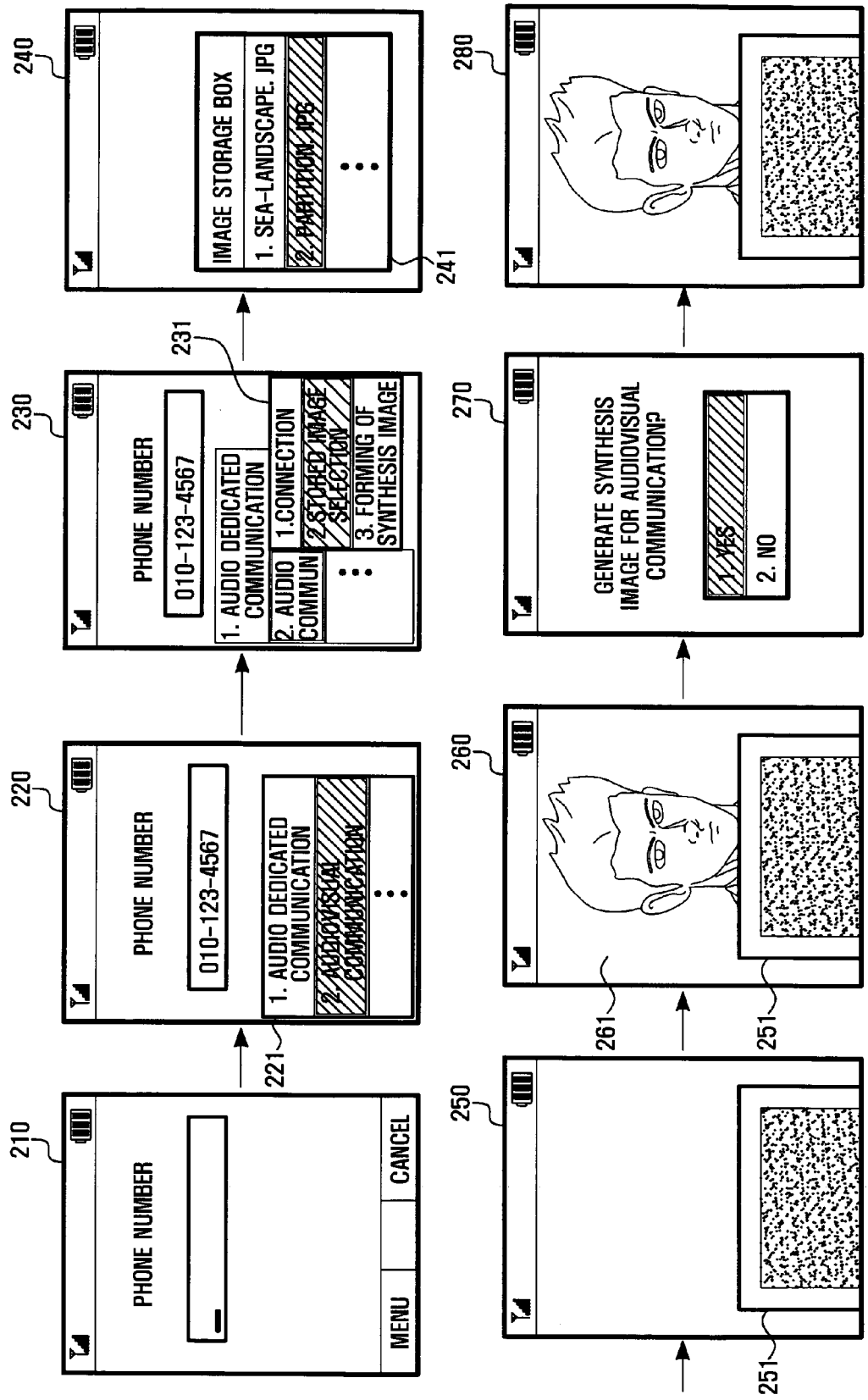
FIG. 2A illustrates screen examples for a method of synthesizing an image for audiovisual communication according to another exemplary embodiment of the present invention.

FIG. 2A shows screen examples for a method of synthesizing an image for audiovisual communication according to another exemplary embodiment of the present invention. The screen examples illustrate a case for synthesizing an input sensor image and a stored image before performing audiovisual communication.

Referring to FIG. 2A, in a screen 210, a user inputs another party's information, such as a phone number, in order to start communication. Upon inputting another party's information, a screen 220 is displayed, and the user selects a kind of communication to perform using the input information of the other party. A communication kind list 221 is displayed in the screen 220 to select the kind of communication. Here, a communication request method is not limited to the above-described method. For example, a communication request may be directly performed without a process of selecting a communication kind by inputting another party's information to the screen 210 and then inputting a specific key dedicated to audio communication or to audiovisual communication in the input unit 170. In the illustrated example, the user selects audiovisual communication from the communication kind list 221 of the screen 220, and a list 231 of audiovisual communication functions is displayed in a screen 230. The user selects a function for a stored image selection from the list 231 of audiovisual communication functions of the screen 230. Here, the function of stored image selection is a function of selecting a stored image for synthesizing with a sensor image input through the camera sensor of the camera unit 150 (hereinafter, a 'sensor image'). Upon selection of the stored image selection function, a list 241 of images is displayed in the screen 240 in order to select one of the stored images. In the example, a folder including a list of stored images is displayed in the list 241 as an 'image storage box'. The displayed folder can be changed according to user selection. Further, in the list 231 of audiovisual communication functions displayed in the screen 230, an image forming function is a function of forming an image to be synthesized with a sensor image and is described in detail later in relation to FIG. 3A.

In the example, an image file 'partition.jpg' is selected from the list 241 of the stored images in the screen 240, and the stored image 'partition.jpg' is displayed in a screen 250 as a stored image 251. In a state where the stored image 251 is displayed, an object of a sensor image 261, such as a user's face, is displayed in a screen 260. In this case, the sensor image 261 and the stored image 251 are overlaid and displayed using different layers. The user can choose a position of an object of the sensor image 261 and a position of an object of the stored image 251 in the screen 260. Upon completion of positioning the objects, the user inputs a predetermined key notifying completion, and a screen 270 is displayed for the user to select whether to generate a synthesis image for audiovisual communication. If the user inputs a request for generating a synthesis image for audiovisual communication to the screen 270, the generated synthesis image is displayed in the screen 280. When generating a synthesis image, object information of an object of the stored image and object information of an object of the sensor image are stored in the storage unit 140. Here, the object information of the object of the stored image and the object information of the object of the sensor image are divided and stored separately. In this case, object information of an image includes information representing an object of an image, such as a size and a position of the object. When transmitting object information of the synthesis image, it is assumed that an MPEG4 encoding method is used for compressing and encoding only change information of the object. When a synthesis image for audiovisual communication is generated, the user determines whether to perform audiovisual communication with another party corresponding to another party's information input on the screen 210. If the user inputs a request for performing audiovisual communication, audiovisual communication is performed while transmitting the generated synthesis image to the other party's terminal. Object information of the stored image also is changed according to a change of object information of the input sensor image while performing audiovisual communication, for example, when an object of the sensor image moves. The stored image is synthesized with the sensor image, and the synthesized image is transmitted to the other party's terminal. This is described in detail with reference to FIG. 2B.

Figure 2B:
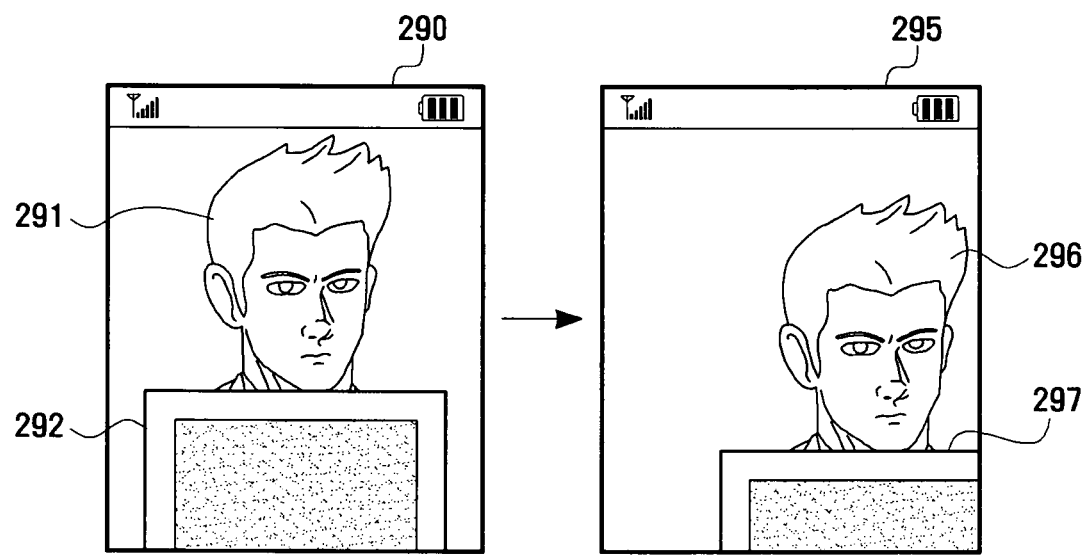
FIG. 2B illustrates screen examples for a change of a synthesis image when an object of a sensor image moves while performing audiovisual communication in the method of FIG. 2A.

FIG. 2B shows screen examples illustrating a change of a synthesis image when an object of a sensor image moves while performing audiovisual communication in the method of FIG. 2A.

Referring to FIG. 2B, in a screen 290, the synthesis image of the stored image and the sensor image is displayed in the other party's terminal when performing audiovisual communication. An image transmitted to another party's terminal in order to perform audiovisual communication is encoded and transmitted by a video encoding method, such as an MPEG4 encoding method, for easy transmission. The MPEG4 encoding method is a method of encoding moving picture frames into an intra-coded frame (I-frame), predictive-coded frame (P-frame), and bidirectional-coded frame (B-frame). The I-frame is a key frame including actual image data, used for random access of data, and is encoded without referring to other images. The P-frame is a frame formed with change information based on I-frame information and P-frame information of the previous frame. The B-frame is a frame formed based on I-frame information and P-frame information of the previous frame, and I-frame information and P-frame information of the subsequent frame, and has a much higher compression ratio than that of the I-frame and the P-frame. Accordingly, the B-frame has a lowest size and picture quality. If images are synthesized as an image for audiovisual communication, as shown in the screen 280 of FIG. 2A, the synthesized image is stored in a buffer with the I-frame, and when audiovisual communication is started, the synthesized image is provided to another party. In the MPEG4 encoding method, significant objects are divided from each image using a contour search algorithm and compressing and encoding information, such as a motion variable, contour line variable, and color variable of divided objects. That is, the MPEG4 encoding method encodes only change information of a changing object without encoding of entire image information. Therefore, when images are synthesized and encoded, information of each divided object is encoded and transmitted to another party's terminal, as shown in the screen 290. After transmitting the screen 290, if a changed frame corresponding to a screen 295 is transmitted, changed object information between the objects of the screen 290 and the screen 295 is encoded and transmitted. A process of synthesizing an image after an object change of the stored image according to an object change of the sensor image, such as when the sensor image moves, as in the screen 295, is described later with reference to FIGS. 4 and 5.

In a state where a synthesis image of the sensor image and the stored image is displayed, as in the screen 290, when an object 291 of the sensor image moves, a changed image is displayed in the screen 295. When position information of the object 291 of the sensor image of the screen 290 changes, such as when the object 291 moves, a new object 296 of a sensor image is displayed in the screen 295, and a position of the object 292 of the stored image on the screen 290 is moved accordingly to a new position of an object 297 displayed in the screen 295 by using the changed object information of the object 292 of the stored image in the screen 290. The screen 295 of FIG. 2B illustrates a example where a position of the object on the screen 290 changes from a previous frame, such as a case where the object on the screen 290 moves, however, an object of the stored image also can be changed according to an object change of the sensor image when another information of an object changes, such as when a size of the object on the screen 290 changes. As shown in the screen 295, if the object 296 of the sensor image moves, such as if another party's face moves, the object 297 of a stored image, such as a partition.jpg, also is moved and thus, a synthesized image is displayed. Accordingly, in the present exemplary embodiment, when performing audiovisual communication, an object of a stored image also is changed according to a change of an object of a sensor image, such as movement or a size change of an object of the sensor image, and thus, an image that the user desires to transmit can be maintained until audiovisual communication terminates.

FIG. 3A shows screen examples illustrating a method of synthesizing an image for audiovisual communication according to another exemplary embodiment of the present invention. The screen examples illustrate a case of synthesizing an input sensor image and an image formed while performing audiovisual communication, using a touch screen of the display unit 180 to perform a function of an input unit.

Referring to FIG. 3A, a screen 310 is displayed in the display unit 180 when performing audiovisual communication. An image 311 of another party transmitted from the other party's terminal for audiovisual communication and a sensor image 312 are each displayed in a predetermined area in the screen 310. The user performs a predetermined input method to display a list 321 of functions related to audiovisual communication in a screen 320, such as by inputting a 'menu' key provided in the input unit 170, while performing audiovisual communication in a state of the screen 310. If the user selects an item of 'forming of a synthesis image' from the list 321 of functions related to audiovisual communication, a screen 320 is displayed, in which the user can interchange areas of the display unit 180, in which a sensor image 331 and another party's image 332 are displayed when performing audiovisual communication. That is, a display area of the sensor image 312 displayed in the screen 310 can be changed to a display area of the sensor image 331 displayed in the screen 330, and a display area of another party's image 311 displayed in the screen 310 can be changed to a display area of another party's image 332 displayed in the screen 330. Further, when the screen 310 is converted to the screen 330 in order to form an image, an image forming tool 332, such as an image forming pen, may be displayed in the screen 330. In FIG. 3A, the display unit 180 includes a touch screen providing a function of the input unit 170, wherein a touch sensor detects a user's operation in the display unit 180. The user's operation is detected by detecting a touch of the display unit 180 by the user, and an image can be formed through the detected operation. However, other methods of detecting a user's operation in the display unit 180 may be used. For example, the mobile terminal may have a heat sensor for detecting heat emitted towards the display unit 180 by the user or a pressure sensor for detecting a pressure level of the display unit 180 in addition to a touch sensor.

An image is formed using the image forming tool 333 displayed in the screen 330. Other image forming means may be used in place of the displayed image forming tool 333, for example touching the touch screen by a finger or touching tool. Further, the user can select various types of input using the image forming tool 333, for example a thickness, shape, and color of a line. A screen 340 shows a screen example in which an image 344 (hereinafter, a 'formed image') is formed using the image forming tool 333 in the display area of the display unit 180 that displays the sensor image 331. When forming of the formed image 344 is complete, the user inputs a predetermined key notifying completion of image forming in the screen 340, such as a completion key 345, and the screen 340 is converted to a screen 350.

The formed image 344 generated on the screen 340 is stored as a formed image. The formed image 344 and the sensor image 341 are synthesized in the screen 350. Object information of an object of the synthesized formed image and object information of an object of the sensor image are stored in the storage unit 140. When forming a synthesis image, it is assumed that the object information of the object of the stored image and the object information of the object of the sensor image are divided and stored separately. In this case, object information of an image includes any information representing an object of the image, such as a size and a position of an object. The formed image 344 can be generated using various methods, such as, a method for detecting a user's operation through the input unit 170, acquiring multiple coordinates of objects of a formed image, and thereby acquiring position information of a point, line, and surface for forming the object. In this case, position information of an object is obtained by storing input information as a layer in a buffer whenever position information input by a user constitutes a unit. When an input notifying completion of image forming by a user is received, a formed image can be generated by synthesizing the stored layers. Further, position information constituting a unit may be an input of a single position at more than one time, an input of a plurality of positions at more than one time, and position movement of an input state at more than one time within a predetermined time period. When image synthesis is completed, the display area of the sensor image 331 and the display area of another party's image 332 displayed in the screen 340 are again interchanged, and a screen 360 displays a sensor image 362 and another party's image 361. A state of the mobile terminal is returned to the state existing before forming of the synthesized image, and thus, audiovisual communication can be performed continuously. In this case, the sensor image 362 is the synthesized image formed by synthesizing the sensor image 331 and the formed image 344 generated in the screen 340.

Figure 3B:
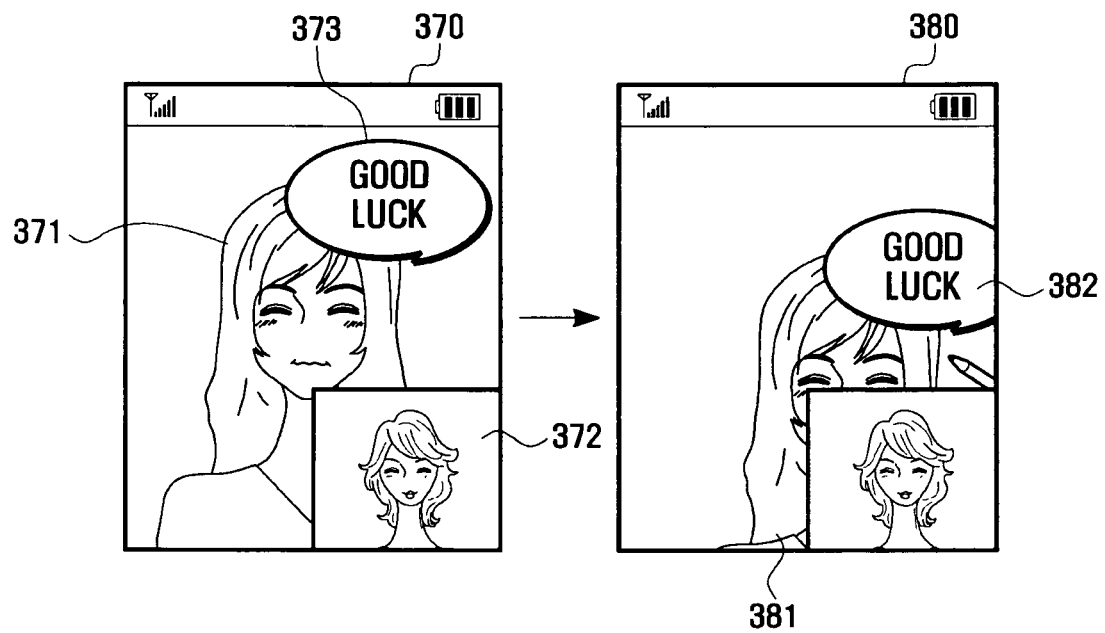
FIG. 3B illustrates screen examples for a change of a synthesis image when an object of a sensor image moves while performing audiovisual communication in the method of FIG. 3A.

FIG. 3B shows screen examples for a change of a synthesis image when an object of a sensor image moves while performing audiovisual communication in the method of FIG. 3A.

Referring to FIG. 3B, a screen 370 is displayed in another party's terminal for performing audiovisual communication using a synthesis image of a sensor image and a formed image, as shown in FIG. 3A. Further, a screen 380 is a screen example in which a further image signal is received and decoded after displaying the screen 370, and in which the image signal is displayed in another party's terminal in order to perform audiovisual communication. FIG. 3B illustrates screen examples displayed in another party's terminal in order to illustrate an example of audiovisual communication. For convenience of description, the following description is described based on a mobile terminal that can perform image synthesis. Accordingly, a synthesis image synthesized from a previously input sensor image, a formed image, and an image 372 input through a camera unit of another party's terminal, are displayed in the screen 370. Further, a synthesis image of a presently input sensor image and a formed image can be displayed, as in a screen 380. When position information of an object 371 of the sensor image of the screen 370 changes, such as when the object 371 moves, an object 373 of a sensor image of the screen 370 is moved to an object 382 of a formed image of the screen 380 by changing object information of an object 373 of a formed image of the screen 370 using the changed position information. A process of changing an object of a formed image as an object of the sensor image changes, and of synthesizing an image there from, as in the screen 380, is described later with reference to FIGS. 4 and 5. The screen 380 of FIG. 3B illustrates a case where a position of an object on the screen 370 changes from a previous frame, such as a case where an object moves, however an object of a formed image can also be changed according to an object change of the sensor image when another information of an object of the sensor image changes, such as when a size of the object changes. Accordingly, in the present exemplary embodiment, when performing audiovisual communication, an object of a stored image also is changed and displayed according to an object change of the sensor image, such as movement or a change of a size of an object of a sensor image. Therefore, an image intended by a user can be maintained until audiovisual communication terminates.

In the foregoing description, a case of synthesizing an image from a stored image and a sensor image before performing audiovisual communication and a case of synthesizing an image from a formed image and a sensor image while performing audiovisual communication are described. However, an image can be synthesized in other cases. For example, an image can be synthesized from a formed image and a sensor image before performing audiovisual communication, or an image can be synthesized from a stored image and a sensor image while performing audiovisual communication.

FIG. 4 illustrates a flowchart a method of performing audiovisual communication using a synthesis image in a mobile terminal according to another exemplary embodiment of the present invention. FIG. 4 illustrates a case of synthesizing an image before performing the audiovisual communication.

Referring to FIG. 4, when the mobile terminal is in an audiovisual communication standby mode (block 405), the controller 130 determines whether a request for synthesis of a stored image is input (block 410). Here, the audiovisual communication standby mode is a state in which another party's information is input and an audiovisual communication function can be selected, as in the screen 220 of FIG. 2A. If a request for synthesis of a stored image is input, the controller 130 receives a selection input of a stored image to be synthesized (block 415). In this case, in order for the user to select an image to be synthesized, a list of stored images is displayed in the display unit 180. The controller 130 controls the display unit 180 to display the selected stored image and a sensor image input through the camera unit 150, as in the screen 260 (block 420). If a request for synthesis of the selected stored image and the sensor image is input, the controller 130 synthesizes the stored image and the sensor image displayed in the display unit 180 into a synthesis image (block 425). Here, the sensor image is an image processed by the image processor 160 in units of a frame. The image processor 160 receives image signals input through the camera sensor of the camera unit 150 until the input image signals form a frame unit, then processes the image signal frame unit according to a size and characteristic of the display unit 180 and displays the resulting image. The sensor image to be synthesized with the stored image is an image of a frame unit, and the stored image is also stored in units of a frame.

The controller 130 stores object information of objects of the synthesis image (block 430). For example, the controller 130 controls the storage unit 140 to store object information of the sensor image, such as another party's face, and object information of the stored image, such as a position and a color of an object divided by a partition, as in the screen 280. The synthesis image is stored in a buffer of the storage unit 140 or of the image processor 160. Particularly, in order to enable change of object information of a stored synthesis image according to a change of object information of the sensor image, object information of the synthesis image is stored in the storage unit 140. The controller 130 determines whether a request for audiovisual communication is input (block 435). If a request for audiovisual communication is input, the controller 130 transmits the synthesis image as an audiovisual communication image to another party's terminal (block 440). In order to perform audiovisual communication, the sensor image is continuously transmitted to another party's terminal in units of a frame. The controller 130 continues to receive an input sensor image through the camera unit 150. When a sensor image corresponding to a quantity of a frame is input, the controller 130 compares object information of a present frame with that of a previous frame, and thereby determines whether object information of the sensor image changes (block 445). Particularly, the controller 130 determines whether object information of an object synthesized with an image that is designated by a user (hereinafter, a 'designated image'), for example the object 291 of FIG. 2B and the object 371 of FIG. 3B, changes. For convenience of description, a frame image in which a sensor image is presently input in units of a frame through the camera unit 150 is referred to as a 'present sensor image', and a sensor image of the frame immediately preceding the present input frame is referred to as a 'previous sensor image'. When information of an object of the sensor image changes, the controller 130 changes object information of a designated image, such as a stored image or a formed image to be synthesized with the present sensor image, synthesizes the images, encodes the synthesis image, and transmits the synthesis image to another party's terminal according to change information between objects of the present sensor image and the previous sensor image (block 450). Here, an encoded image is information of only the changed objects when comparing with the previous image, as described herein above, and only the changed information of objects is encoded and transmitted to another party's terminal. The change information includes information such as a changed position, size, and rotational orientation of an object. Change information of a position can be acquired by obtaining a motion variable, for example a motion vector, between compared objects. A method of obtaining a motion vector can be obtained by a well-known technology and therefore a detailed description thereof is omitted. When size information of an object changes, information of a size change between objects can be acquired using a contour line variable, and an object size of a designated image is also changed by a change ratio of an object size of the sensor image according to the acquired size change information. Further, when a rotational orientation of an object of the sensor image changes, information of the rotational orientation change can be acquired. Change information of a rotational orientation can be obtained by setting a center of a specific object as a reference orientation axis and measuring the change of orientation of the reference orientation axis. Thereafter, a rotational orientation of an object of the designated image is also changed according to the obtained change information of a rotational orientation of the sensor image. The controller 130 changes object information of a designated image according to a change of object information of the sensor image using change information acquired through such a method. If no object information of the sensor image changes at block 445, the controller 130 synthesizes and encodes the designated image and the sensor image without changing object information of the designated image and transmits the encoded signal image to another party's terminal (block 495). In this case, because no object information changes, transmission of the image may be omitted. The controller 130 determines whether audiovisual communication is terminated (block 455). If audiovisual communication is not terminated, the process returns to block 445.

If a request for audiovisual communication is not input at block 435, the controller 130 controls the storage unit 140 to store the synthesized image (block 460). When the synthesis image is stored, information of divided objects of the synthesized image is also stored. The controller 130 determines whether audiovisual communication standby mode is terminated (block 465). If the audiovisual communication standby mode is not terminated, the process returns to block 405.

If a request for synthesis of a stored image is not input at block 410, the controller 130 determines whether a request for forming a synthesis image is input (block 470). If a request for forming a synthesis image is not input, the process returns to block 405. If a request for forming the synthesis image is input, the controller 130 converts a mode of the mobile terminal to an image forming mode (block 475) and receives an image forming input (block 480). In this exemplary embodiment, the image forming mode is a mode of displaying the image forming pen 333 and detecting an image forming input from the user using the image forming pen 333, as in the screen 330 of FIG. 3A. The image forming input can be detected by a touch sensor of the input unit 170, and may further be detected by at least one of a heat sensor and a pressure sensor as well as the touch sensor. In a mode of detecting an image forming input, when the touch sensor of the input unit 170 detects a touch of the display unit 180 by a user, an image is formed according to the detected touch. When an input notifying completion of image forming is received, the controller 130 synthesizes the formed image and a sensor image displayed in the display unit 180 (block 485), and the process then advances to block 430 for storing object information of objects of the synthesis image. In the foregoing description, an object of the designated image is also changed according to an object change of the sensor image. However, the user can select to maintain an object of the designated image regardless of an object change of the sensor image. In this case, an enable function of changing a designated image according to a change of a sensor image and a disable function of not changing a designated image regardless of a change of a sensor image are provided to be selected by a user. If the enable function is selected, an object of the designated image is also changed according to change information of an object of the sensor image, as described in FIG. 4, and the changed sensor image and the changed designated image are synthesized. If the disable function is selected, even if an object of the sensor image changes, an object of the designated image is not changed, and the changed sensor image and the unchanged designated image are synthesized.

Accordingly, if an object of the sensor image changes, an object of a stored image or of a formed image to be synthesized with the sensor image is also changed. Thus, the present invention continues to perform audiovisual communication in a state in which synthesis of images is requested, such as a synthesis state of objects of an image.

Figure 5:
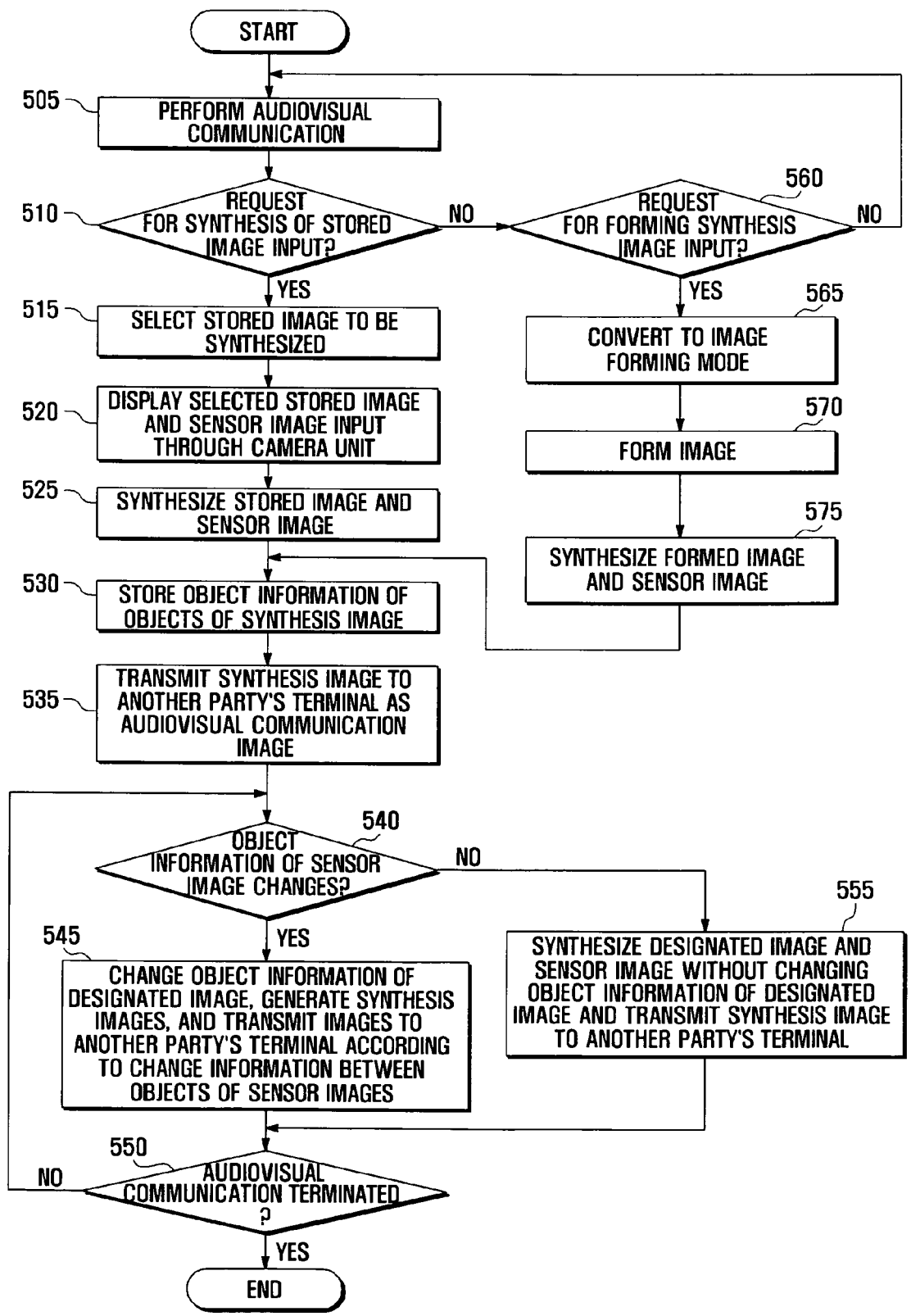
FIG. 5 illustrates a flowchart for a method of performing audiovisual communication using a synthesis image according to another exemplary embodiment of the present invention.

FIG. 5 illustrates a flowchart for a method of performing audiovisual communication using a synthesis image according to another exemplary embodiment of the present invention. FIG. 5 illustrates a case of synthesizing an image while performing the audiovisual communication.

Referring to FIG. 5, the controller 130 performs audiovisual communication (block 505). The controller 130 determines whether a request for synthesis of a stored image and a sensor image is input (block 510). If a request for synthesis of a stored image and a sensor image is input, the controller 130 receives a selection input of a stored image to be synthesized (block 515). In this case, in order for the user to select a stored image to be synthesized, the controller 130 controls the display unit 180 to display a list of stored images. The controller 130 controls the display unit 180 to display the selected stored image and a sensor image input through the camera unit 150, as in the screen 260 (block 520). If a request for synthesis of the selected stored image and the sensor image is input, the controller 130 synthesizes the stored image and the sensor image displayed in the display unit 180 into a synthesis image (block 525). Here, the sensor image is an image processed by the image processor 160 in units of a frame. The image processor 160 receives image signals input through the camera sensor of the camera unit 150 until the input image signals from a frame unit, then processes the image signal frame unit according to a size and characteristic of the display unit 180 and displays the resulting image. The sensor image to be synthesized with the stored image is an image of a frame unit, and the stored image is also stored in units of a frame.

The controller 130 stores object information of objects of the synthesis image (block 530). For example, the controller 130 controls the storage unit 140 to store object information of the sensor image, such as another party's face, and object information of the stored image, such as a position and a color of an object divided by a partition, as in the screen 280. The synthesis image is stored in a buffer of the storage unit 140 or of the image processor 160. Particularly, in order to enable change of object information of a stored synthesis image according to a change of object information of the sensor image, object information of the synthesis image is stored in the storage unit 140. Here, object information of objects of a synthesis image includes information of a size, position, and rotational orientation of each object. When some of the object information changes, particularly when object information of the sensor image changes, object information such as the position, size, and rotational orientation of the designated image is changed according to the change information. The controller 130 transmits the synthesis image as an audiovisual communication image to another party's terminal (block 535). In order to perform audiovisual communication, the sensor image is continuously transmitted to another party's terminal in units of a frame. As described above, the sensor image continuously transmitted to another party's terminal is a synthesis image of the designated image and the sensor image, and may be a frame including only change information of objects divided from the synthesis image by an MPEG4 encoding method. The controller 130 continues to receive an input sensor image through the camera unit 150. When a sensor image corresponding to a quantity of a frame is input, the controller 130 compares object information of a present frame with that of a previous frame, and thereby determines whether object information of the sensor image changes (block 540). Particularly, the controller 130 determines whether object information of an object synthesized with an object of the designated image, such as object information of the object 291 of FIG. 2B and the object 371 of FIG. 3B, changes. For convenience of description, a frame image in which a sensor image is presently input in units of a frame through the camera unit 150 is referred to as a 'present sensor image', and an image of the previous frame immediately preceding the present input frame is referred to as a 'previous sensor image'. When information of an object of the sensor image changes, the controller 130 changes object information of a designated image, such as a stored image or a formed image to be synthesized with the present sensor image, synthesizes the images, encodes the synthesis image, and transmits the encoded synthesis image signals to another party's terminal according to change information between objects of the present sensor image and the previous sensor image (block 545). Here, an encoded image is information of only the changed objects when comparing with the previous synthesis image, as described above. Additionally only the changed information of objects is encoded and transmitted to another party's terminal. The change information includes information such as a changed position, size, and rotation direction of an object. Change information of a position can be obtained by obtaining a motion variable, for example a motion vector, between compared objects. A method of obtaining a motion vector can be obtained by a well-known technology and therefore a detailed description thereof is omitted. When size information of an object changes, information of a size change between objects can be acquired using a contour line variable. Further, when a rotational orientation of an object of the sensor image changes, information of the rotational orientation change can be acquired. Change information of a rotational orientation can be obtained by setting a center of a specific object as a reference orientation axis and measuring the change of orientation of the reference orientation axis. The controller 130 changes object information of a designated image according to a change of object information of the sensor image using change information acquired through such a method. If no object information of the sensor image changes at step 540, the controller 130 synthesizes and encodes the designated image and the sensor image without changing object information of the designated image and transmits the encoded image signal to another party's terminal (block 555). In this case, because no object information changes, transmission of the image signal may be omitted. The controller 130 determines whether audiovisual communication is terminated (block 550). If audiovisual communication is not terminated, the process returns to step 540.

If a request for synthesis of a stored image is not input at block 510, the controller 130 determines whether a request for forming a synthesis image is input (block 560). If a request for forming a synthesis image is not input, the process returns to block 505. If a request for forming a synthesis image is input, the controller 130 converts a mode of the mobile terminal to an image forming mode (block 565) and receives an image forming input (block 570). In this exemplary embodiment, the image forming mode is a mode of displaying the image forming pen 333 and detecting an image forming input from the user using the image forming pen 333, as in the screen 330 of FIG. 3A. The image forming input can be detected by a touch sensor of the input unit 170, and may further be detected by at least one of a heat sensor and a pressure sensor as well as the touch sensor. When an input notifying completion of image forming is received, the controller 130 synthesizes the formed image and a sensor image displayed in the display unit 180 (block 575). The process then advances to block 530 for storing object information of objects of the synthesis image.

As described above, according to the present invention, by performing audiovisual communication using an image synthesized before or while performing audiovisual communication, an undesired exposure of a portion of a user's image can be intercepted, thereby improving a service quality of audiovisual communication and user satisfaction. Further, when performing audiovisual communication, a user's image to be provided to another party's terminal can be formed with a desired image and can be provided to another party's terminal, thereby protecting the user's privacy and improving user satisfaction. Further, as the mobile terminal has a function of providing an entertainment device, the present invention enables a user to provide various image changes to provide entertainment beyond simple audiovisual communication. Further, in the present invention, when an object of an image input through a camera sensor moves, an object of a synthesis image also moves and thus a state of an image formed by a user, such as a synthesized state of objects of an image, can be maintained.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of synthesizing an image in a mobile terminal, comprising:
generating, when a request for synthesizing a sensor image input through a camera sensor and an image designated by a user is input, a synthesis image of the sensor image and the designated image;
storing, when the synthesis image is generated, object information of an object of the sensor image and object information of an object of the designated image;
determining whether object information of the object of a subsequent sensor image input through the camera sensor is changed;
changing, when object information of the object of the subsequent sensor image input through the camera sensor is changed, object information of the designated object according to the changed object information of the object of the sensor image; and
synthesizing the subsequent sensor image and the designated image in which object information has changed.

2. The method of claim 1, wherein determining whether object information of the object of a subsequent sensor image input through the camera sensor is changed comprises:
receiving the subsequent sensor image input through the camera sensor;
comparing object information of the object of the subsequent sensor image of the input sensor image with object information of the object of the sensor image of the previously input sensor image; and
acquiring, when the object information of the subsequent sensor image and that of the previously input sensor image are not identical, the changed object information of the object of the subsequent sensor image.

3. The method of claim 2, wherein the change of object information of the object of the subsequent sensor image comprises a change of at least one of a size, position, and rotational orientation of the object of the sensor image.

4. The method of claim 3, wherein changing object information of the designated object comprises changing, when the change of object information of the object of the subsequent sensor image is a change of position, the position of the designated object to correspond to the change of position of the object of the sensor image.

5. The method of claim 3, wherein changing object information of the designated object comprises changing, when the change of object information of the subsequent sensor object is the change of the size, a size of the object of the designated image by a size change ratio identical to the size change ratio of the object of the sensor image.

6. The method of claim 3, wherein changing object information of the designated object comprises changing, when the change of object information of the object of the subsequent sensor image is the change of rotational orientation, a rotational orientation of the object of the designated image to correspond to the change of rotational orientation of the object of the sensor image.

7. The method of claim 1, wherein the generated synthesis image and the changed synthesis image are transmitted to another party's terminal when performing audiovisual communication.

8. The method of claim 7, wherein the synthesis images are encoded using MPEG4 for transmission.

9. The method of claim 1, further comprising:
selecting a stored image as the designated image; and
displaying the selected stored image and the sensor image.

10. The method of claim 1, further comprising:
converting, when an image is to be formed for designating as the designated image, a mode of the mobile terminal to an image forming mode;
detecting an image input by a user in the image forming mode; and
generating a formed image according to the detected image input.

11. The method of claim 10, wherein the image input by a user is detected by a touch sensor.

12. An image synthesizing device in a mobile terminal, comprising:
a camera unit configured to input a sensor image;
a display unit configured to display the sensor image and an image designated by a user;
a controller configured to synthesize, when a request for synthesizing an image is input, the sensor image displayed in the display unit and the designated image, the controller further configured to determine whether object information of an object of a subsequent sensor image input through the camera sensor is changed, change, when object information of the object of the subsequent sensor image is changed, object information of an object of the designated image to correspond to the change of object information of the object of the sensor image and synthesize the subsequent sensor image and the designated image in which object information has changed; and
a storage unit configured to store, when the images are synthesized, the object information of the object of the sensor image and the object information of the designated object.

13. The image synthesizing device of claim 12, wherein the controller is configured to compare, when the subsequent sensor image is input through the camera unit, object information of the sensor object of the input subsequent sensor image with object information of the sensor object of a previously input sensor image, and acquire, when the object information of the input subsequent sensor image and that of the previously input sensor image are not identical, the changed object information of the object of the input subsequent sensor image.

14. The image synthesizing device of claim 13, wherein the change of object information of the sensor object comprises a change of at least one of a size, position, and rotational orientation of the sensor object.

15. The image synthesizing device of claim 14, wherein the controller is configured to change, when the change of object information of the sensor object is a change of position, a position of the designated object to correspond to the change of position of the sensor object.

16. The image synthesizing device of claim 14, wherein the controller is configured to change, when the change of object information of the sensor object is a change of size, a size of the designated object by a size change ratio identical to the size change ratio of the sensor object.

17. The image synthesizing device of claim 14, wherein the controller is configured to change, when the change of object information of the sensor object is a change of rotational orientation, a rotational orientation of the designated object to correspond to the change of rotational orientation of the sensor object.

18. The image synthesizing device of claim 12, further comprising a radio frequency (RF) unit configured to transmit the synthesis image and the changed synthesis image to another party's terminal when performing audiovisual communication.

19. The image synthesizing device of claim 12, further comprising an input unit configured to select a stored image as the designated image.

20. The image synthesizing device of claim 12, further comprising an input unit including a sensor configured to detect an image input by a user in an image forming mode, wherein the image formed by the user is designated as the designated image.

21. The image synthesizing device of claim 20, wherein the sensor is at least one of a touch sensor, heat sensor, pressure sensor, terrestrial magnetism sensor, and acceleration sensor.

22. The image synthesizing device of claim 20, wherein the display unit comprises a touch screen configured to be used as the input unit.

* * * * *